Jan. 19, 1926.  
C. A. GODSHALK  
1,570,476  
LOCKED NUT APPARATUS  
Filed July 22, 1924
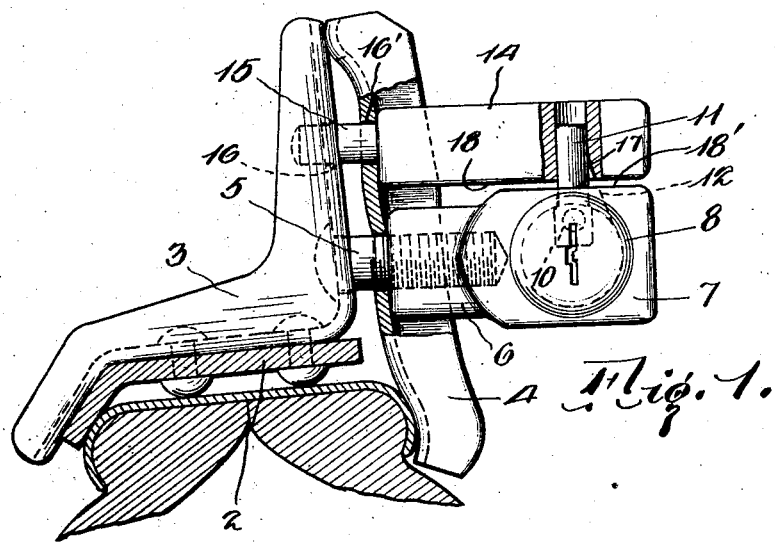
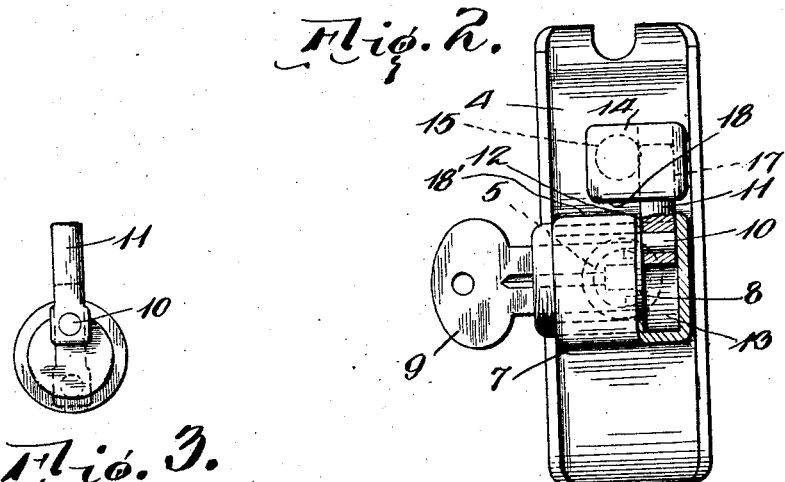
Inventor,  
Clarence A. Godshalk.  
By John J. Barker  
Attorney Patented Jan. 19, 1926.

1,570,476

UNITED STATES PATENT OFFICE.

CLARENCE A. GODSHALK, OF PHILADELPHIA, PENNSYLVANIA.

LOCKED-NUT APPARATUS.

Application filed July 22, 1924. Serial No. 727,481.

*To all whom it may concern:*

Be it known that I, CLARENCE A. GODSHALK, a citizen of the United States, residing at Philadelphia, in the county of Philadelphia and State of Pennsylvania, have invented certain new and useful Improvements in Locked-Nut Apparatus, of which the following is a specification.

The invention relates to locked nuts, that is to say, nuts adapted to be applied to bolts from which they are removed from time to time as occasion may require, but which until the time of removal by an authorized person it is desirable should be locked and held against any unauthorized manipulation, either of a meddler or a person maliciously inclined. It has for its object to improve means or apparatus employed for locking such a nut by key-operated lock mechanism. While the invention may be put to a wide variety of uses, it is especially well adapted as a spare tire lock for automobiles, and I have in the accompanying drawings, illustrated the invention in such connection.

Referring to the drawings—

Figure 1 is a sectional view of a spare tire carrier and lock embodying my invention, the locking parts being shown in elevation.

Fig. 2 is an end view of such locking parts.

Fig. 3 is an end view of the key-operated lock, detached.

In the drawings 2 designates the ring or holder upon which is supported the rim of a spare tire, such holder being usually located at the rear of an automobile. To this holder is riveted or otherwise secured a bracket 3 from which extends a screw-threaded bolt or pin 5 which passes freely through an aperture in a clamp piece 4 that is adapted to engage with the tire rim to hold it upon the support 2. The parts thus far described are well known in the art and are standard equipment upon many automobiles. They may be varied in details of construction so far as my present invention is concerned.

A nut 6 engages with the bolt 5 and is employed to bear against the clamp piece and hold it in place against the rim of the tire that may be mounted upon the support 2. There is connected with or carried by this nut a casing 7, being either integral therewith or secured thereto, as may be preferred, and in this casing is supported the rotating barrel 8 of a key-operated lock, in this instance a pin tumbler lock, adapted to be operated by a special key 9.

The barrel of the lock is confined entirely within the casing 7 except for its exposed end in which is formed the hole for the key 9, and carries at its rear or inner end a short pin 10 that is eccentrically disposed with respect to the axis of the lock barrel 8. The pin 10 moves within a chamber 13 at the rear of the lock barrel and is entirely protected and covered by the walls of the casing 7. A bolt 11 is pivotally mounted on the pin 10 and extends outward through an opening 12 in the wall of the casing. The bolt 11 is arranged to move along lines that are at right angles to the axis of the bolt or pin 5 and is projected out through the opening 12 when the lock barrel is moved to the position indicated in Fig. 1, and is retracted and drawn into the casing 7 when the lock barrel is turned, by the key 9, a half revolution from the position indicated in Fig. 1.

14 indicates a post arranged to be rigidly supported adjacent to the nut 6 and casing 7. As represented the post has at one end a reduced portion or pin 15 that is adapted to set into aligning openings 16, 16' formed respectively in the bracket 3 and clamp piece 4. These openings are usually found in the standard equipment of tire-holding parts upon automobiles, and I take advantage of them, as indicated, in supporting the post 14. When mounted as shown, this post is disposed alongside the nut and casing, and is preferably formed with a flat face 18 that is opposed and in close proximity to a flat face 18' of the lock casing 7, with the result that the post positively and directly prevents the turning of the nut and its casing upon the bolt 5 so long as the post is seated and held in place. The locking bolt 11 operates to secure the post in place, holding it in the position indicated in Fig. 2 so long as it engages therewith. This engagement is effected by throwing the lock bolt and causing it to enter an aperture or recess 17 in the outer portion of the post 14. When thus locked, as represented in Fig. 1, it is impossible to remove the post, which thus becomes in effect and operation a rigid part to which the nut 6 is locked, and which prevents the rotation of the nut, first by itself lying directly in the path of rotation of the casing 7, and, further, by reason of the engagement of the lock bolt with the post. The lock bolt performs two locking functions when shot into the opening 17: first, it prevents the removal of the post; and, second, it prevents the turning of the nut. When the bolt 11 is retracted, by the use of the proper key 9, the post is freed and may be removed from its connection with the tire holder, and this separation may take place along right lines which, in the instance represented, are parallel with the axis of the pin or threaded bolt 5.

In the form of my invention illustrated in the drawings the lock casing 7 is at the outer end of the nut 6, and closes at its outer end the screw-threaded opening into which enters the bolt 5. The locking bolt 11 extends outward through one of the sides of the casing so that when projected beyond the face of the lock casing it is in position to operate to prevent rotation of the nut.

What I claim is:

1. The combination with a screw-threaded pin and a nut adapted to engage therewith, of a lock casing carried by the nut and turning therewith, a removable post adapted to be set in position adjacent to the said lock casing and arranged to directly prevent the turning of the nut, the said post and casing having faces set opposite and close to each other, a lock mechanism in the casing, and a bolt adapted to be moved by the lock mechanism so as to bridge the space between the casing and post and to enter a recess provided for it in the post, the lock bolt serving to prevent removal of the post and also the rotation of the nut and casing which it carries.

2. A nut adapted to engage with a screw-threaded pin, a lock casing at the end of the nut closing the screw-threaded opening therein, a lock mechanism supported in the casing, and a locking bolt adapted to be operated by the lock mechanism and located so as to be projected out laterally through one of the sides of the lock casing and beyond the face thereof.

3. The combination with a screw-threaded pin and a nut adapted to engage therewith, the nut carrying a lock casing closing the outer end of the screw-threaded opening therein, a lock mechanism supported in the casing, a locking bolt adapted to be operated by the lock mechanism and located so as to be projected out laterally through one of the sides of the casing and beyond the face thereof, and a movable post located adjacent to the screw-threaded pin so as to interfere with the free rotation of the nut, the locking bolt being arranged to engage with the post when projected.

CLARENCE A. GODSHALK.